US011862195B2

(12) United States Patent
Biskeborn et al.

(10) Patent No.: US 11,862,195 B2
(45) Date of Patent: Jan. 2, 2024

(54) MULTI-CHANNEL RECORDING HEAD HAVING SERVO READERS PROXIMATE TO WRITE TRANSDUCERS AND READ TRANSDUCERS

(71) Applicant: Western Digital Technologies, Inc., San Jose, CA (US)

(72) Inventors: Robert G Biskeborn, Hollister, CA (US); David J. Seagle, Morgan Hill, CA (US); Diane L Brown, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 55 days.

(21) Appl. No.: 17/667,242

(22) Filed: Feb. 8, 2022

(65) Prior Publication Data

US 2023/0253014 A1 Aug. 10, 2023

(51) Int. Cl.
*G11B 21/02* (2006.01)
(52) U.S. Cl.
CPC .................................... *G11B 21/02* (2013.01)
(58) Field of Classification Search
None
See application file for complete search history.

(56) References Cited

U.S. PATENT DOCUMENTS

| 6,222,698 | B1 | 4/2001 | Barndt et al. |
| 7,480,117 | B2 | 1/2009 | Biskeborn et al. |
| 7,876,521 | B2 | 1/2011 | Cherubini et al. |
| 7,894,161 | B2 | 2/2011 | Biskeborn |
| 9,852,747 | B1 * | 12/2017 | Biskeborn .............. G11B 15/62 |
| 10,902,873 | B1 | 1/2021 | Seagle et al. |
| 10,902,882 | B1 * | 1/2021 | Biskeborn .............. G11B 5/584 |

(Continued)

FOREIGN PATENT DOCUMENTS

| EP | 0379324 B1 | 3/1995 |
| WO | 2021053537 A1 | 3/2021 |

OTHER PUBLICATIONS

Argumedo, A. J. et al., "Scaling tape recording areal densities to 100 GB/in2", IBM Journal of Research & Development, vol. 52, No. 4/5, Jul./Sep. 2008, pp. 513-527, https://citeseerx.ist.psu.edu/viewdoc/download?doi=10.1.1.160.4152&rep=rep1&type=pdf.

(Continued)

*Primary Examiner* — K. Wong
(74) *Attorney, Agent, or Firm* — PATTERSON + SHERIDAN, LLP; Steven H. VerSteeg

(57) ABSTRACT

The present disclosure is generally related to a tape head and a tape drive including a tape head. The tape head comprises one or more head assemblies, each head assembly comprising a plurality of write heads aligned in a row, at least one writer servo head aligned with the row of write heads, a plurality of read heads aligned in a row, and at least one reader servo head aligned with the row of read heads. The writer servo head and the reader servo head are independently controllable and are configured to operate concurrently. The tape head is able to accurately and independently position the write heads using the writer servo head(s) when writing data to a tape and position the read heads using the reader servo head(s) when reading data from the tape, even if the write heads and read heads are or become mis-aligned.

22 Claims, 15 Drawing Sheets

(56) References Cited

U.S. PATENT DOCUMENTS

2008/0068750 A1     3/2008   Biskeborn et al.
2014/0327987 A1   11/2014   Biskeborn et al.

OTHER PUBLICATIONS

Richards, Durkee B. et al., "Key Issues in the Design of Magnetic Tapes for Linear Systems of High Track Density", IEEE Transactions on Magnetics, vol. 34, No. 4, Jul. 1998, pp. 1878-1882, https://ieeexplore.ieee.org/document/706731.

\* cited by examiner

MULTI-CHANNEL RECORDING HEAD HAVING SERVO READERS PROXIMATE TO WRITE TRANSDUCERS AND READ TRANSDUCERS

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure writes the data and the other read-verifies the data. A drawback is that the separate structures in conventional heads must be very precisely assembled to enable this function. Another drawback is that the heads are more susceptible to mis-registration between reader and upstream writer caused by tape skew, as a result of the unavoidable separation between the two.

Therefore, there is a need in the art for a tape head configured to write and read verifying data within a single head structure.

SUMMARY OF THE DISCLOSURE

The present disclosure is generally related to a tape head and a tape drive including a tape head. The tape head comprises one or more head assemblies, each head assembly comprising a plurality of write heads aligned in a row, at least one writer servo head aligned with the row of write heads, a plurality of read heads aligned in a row, and at least one reader servo head aligned with the row of read heads. The writer servo head and the reader servo head are independently controllable and are configured to operate concurrently. The tape head is able to accurately and independently position the write heads using the writer servo head(s) when writing data to a tape and position the read heads using the reader servo head(s) when reading data from the tape, even if the write heads and read heads are or become mis-aligned.

In one embodiment, a tape head comprises one or more head assemblies, each of the one or more head assemblies comprising: a plurality of write heads aligned in a first row, the first row extending in a first direction, a plurality of read heads aligned in a second row parallel to the first row, the second row extending in the first direction, at least one writer servo head disposed adjacent to the plurality of write heads, the at least one writer servo head being aligned with the first row in the first direction, and at least one reader servo head disposed adjacent to the plurality of read heads, the at least one reader servo head being aligned with the second row in the first direction.

In another embodiment, a tape head comprises one or more head assemblies, each of the one or more head assemblies comprising: a plurality of write heads aligned in a first row, the first row extending in a first direction, wherein each of the plurality of write heads comprises a first write pole, a second write pole, and a write gap disposed between the first and second write poles, a plurality of read heads aligned in a second row parallel to the first row, the second row extending in the first direction, wherein each of the plurality of read heads comprises a first sensor, at least one writer servo head disposed adjacent to the plurality of write heads, the at least one writer servo head being aligned with the first row in the first direction, wherein the at least one writer servo head comprises a second sensor, and at least one reader servo head disposed adjacent to the plurality of read heads, the at least one reader servo head being aligned with the second row in the first direction, wherein the at least one reader servo head comprises a third sensor.

In yet another embodiment, a tape drive comprises a first head assembly comprising: a plurality of first write heads aligned in a first row, the first row extending in a first direction, a plurality of first read heads aligned in a second row parallel to the first row, the second row extending in the first direction, at least one first writer servo head disposed adjacent to the plurality of first write heads, the at least one first writer servo head being aligned with the first row in the first direction, and at least one first reader servo head disposed adjacent to the plurality of first read heads, the at least one first reader servo head being aligned with the second row in the first direction and aligned with the at least one first writer servo in a second direction perpendicular to the first direction, wherein the at least one first writer servo head and the at least one first reader servo head are configured to operate concurrently. The tape drive further comprises a second head assembly comprising: a plurality of second write heads aligned in a third row, the third row extending in the first direction, a plurality of second read heads aligned in a fourth row parallel to the third row, the fourth row extending in the first direction, at least one second writer servo head disposed adjacent to the plurality of second write heads, the at least one second writer servo head being aligned with the third row in the first direction, and at least one second reader servo head disposed adjacent to the plurality of second read heads, the at least one second reader servo head being aligned with the fourth row in the first direction and aligned with the at least one second writer servo in the second direction. The tape head further comprises a controller configured to operate the at least one second writer servo head and the at least one second reader servo head concurrently.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape head and a tape drive including a tape head. The tape head comprises one or more head assemblies, each head assembly comprising a plurality of write heads aligned in a row, at least one writer servo head aligned with the row of write heads, a plurality of read heads aligned in a row, and at least one reader servo head aligned with the row of read heads. The writer servo head and the reader servo head are independently controllable and are configured to operate concurrently. The tape head is able to accurately and independently position the write heads using the writer servo head(s) when writing data to a tape and position the read heads using the reader servo head(s) when reading data from the tape, even if the write heads and read heads are or become mis-aligned.

Figure 1A:
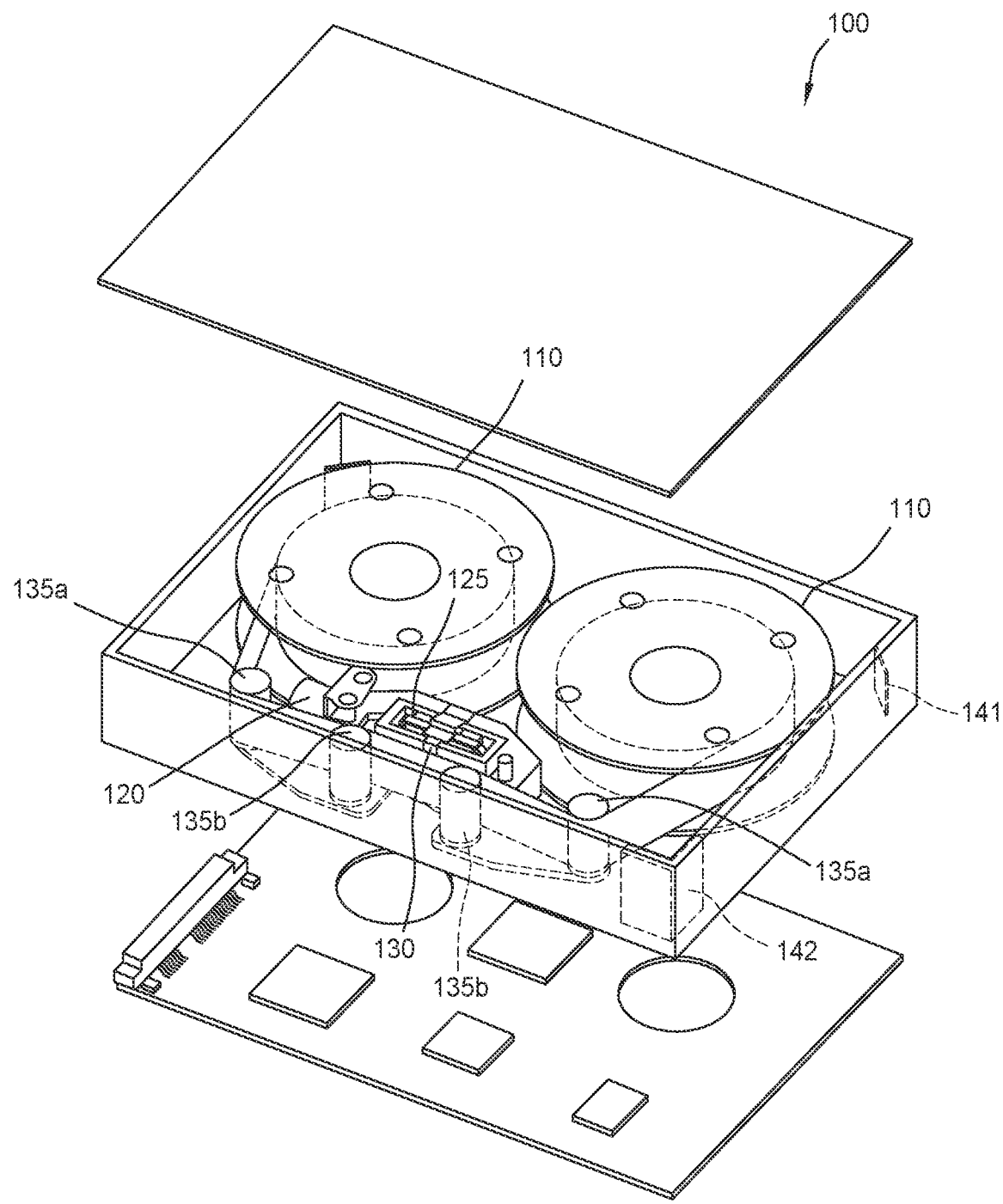
FIGS. 1A-1C illustrate a perspective exploded view, a simplified top down, and side profile view of a tape drive, in accordance with some embodiments.
Figure 1B:
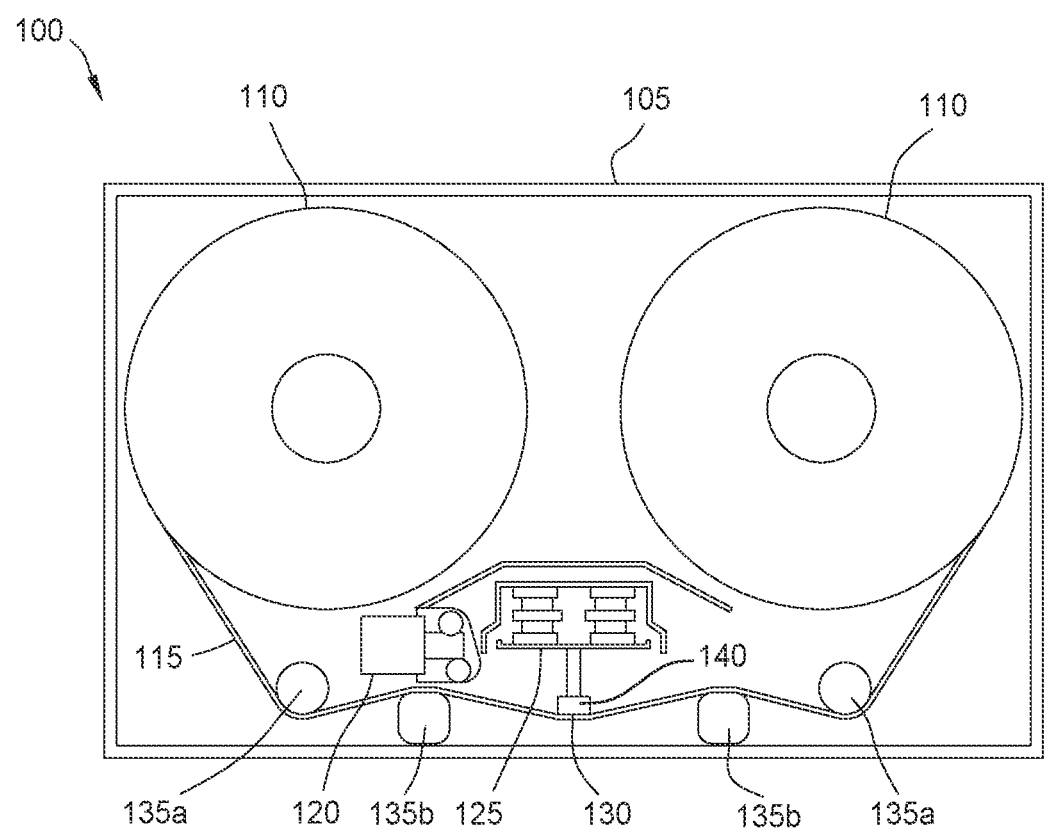
Figure 1C:
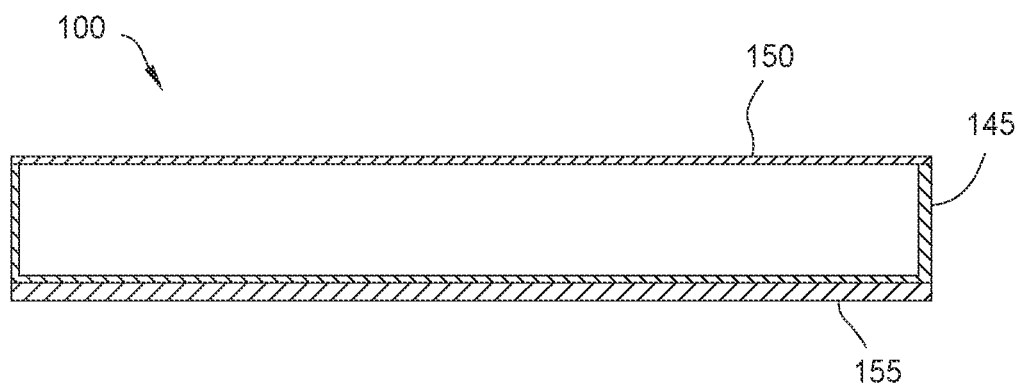

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
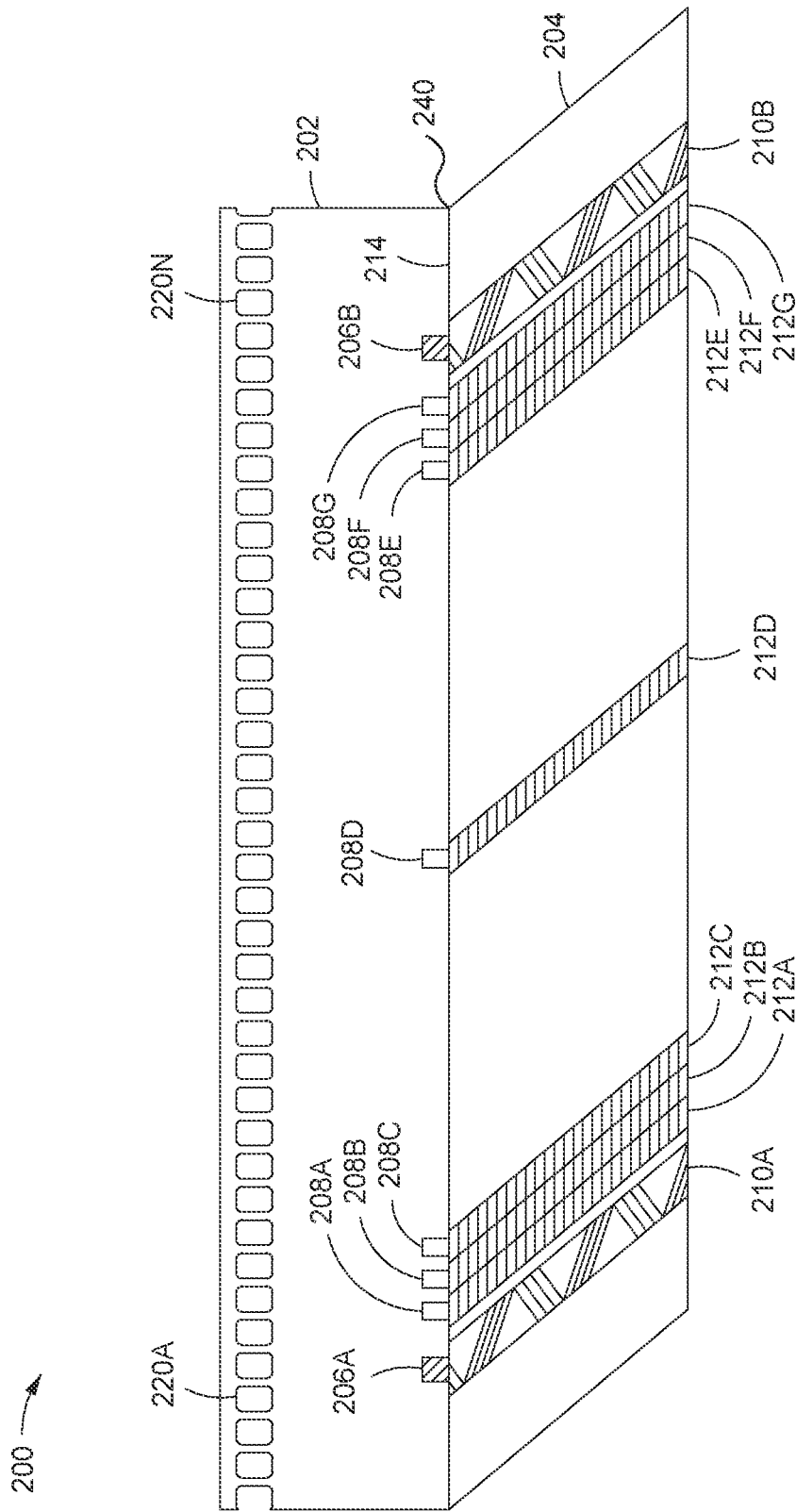
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
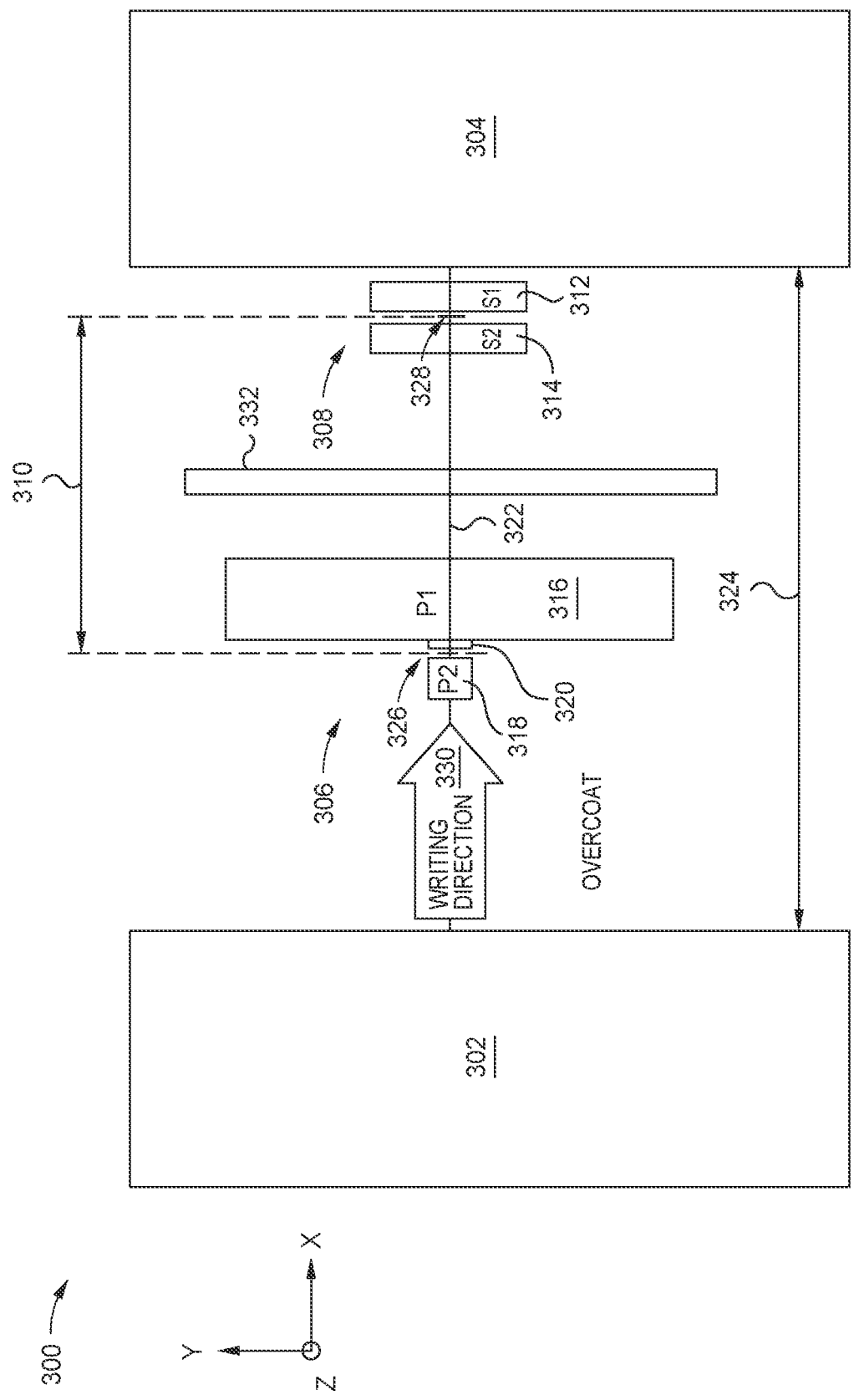
FIGS. 3A-3B illustrate a media facing surface (MFS) view of same gap verify (SGV) head assemblies, according to various embodiments.
Figure 3B:
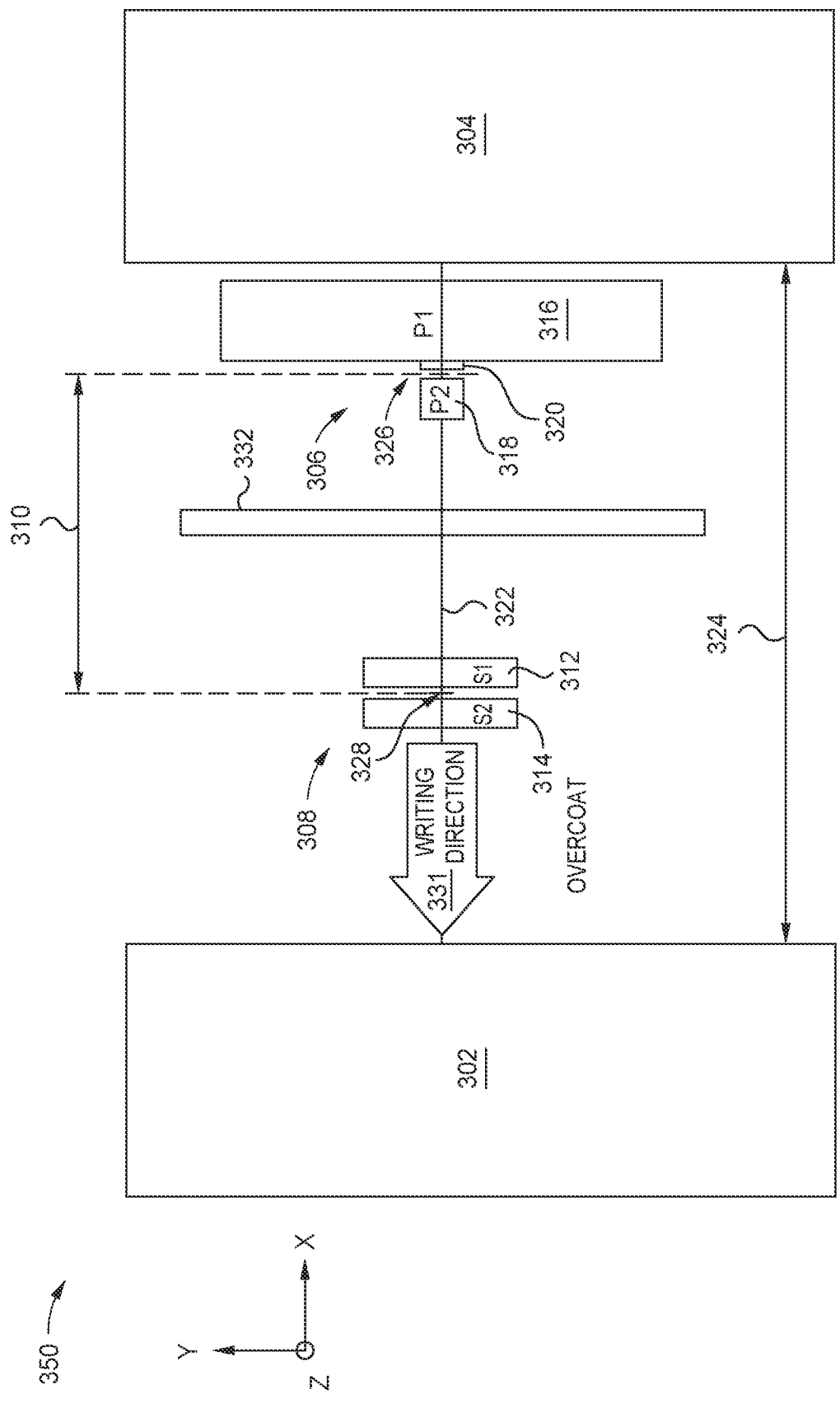

FIGS. 3A-3B illustrate a media facing surface (MFS) view of same gap verify (SGV) head assemblies 300, 350, respectively, according to various embodiments. The SGV head assemblies 300, 350 may be utilized within a tape drive comprising a controller, such as the TED or tape drive 100 of FIG. 1A. The SGV head assemblies 300, 350 may be, or may be parts of, the tape head module assembly 200 of FIG. 2.

The SGV head assembly 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV head assembly 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write head(s) 306, and the read transducer(s) 308 may be referred to as a reader(s) 308 or read head(s) 308.

While only one writer 306 and one reader 308 pair is shown in FIGS. 3A-3B, the SGV head assembly 300 may comprise a plurality of writer 306 and reader 308 pairs, which may be referred to as a head array. For example, in some embodiments, the SGV head assemblies 300, 350 each comprises a head array of 32 writers 306 and 32 readers 308, forming 32 writer 306 and reader 308 pairs, along with one or more servo readers (not shown). In other embodiments, there may be more pairs such as 64, 128 or other numbers.

In each of the SGV head assemblies 300, 350, a writer 306 is spaced a distance 310 from a reader 308 of about 6 μm to about 20 μm, such as about 6 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 60 μm. In some embodiments, a shield 332 is disposed between the writer 306 and the reader 308 of each pair to reduce cross-talk signals to the reader 308 from the writer 306. The shield 332 may comprise permalloy and may be combined with Ir for wear resistance, for example.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the y-direction such that the center axis 322 is aligned with a centerline of the write gap 326 and a centerline of the magnetic sensor 328. In embodiments in which the SGV assembly 300 is actively tilted, such as for compensating TDS, the writer 306 and the reader 308 may be offset relative to the center axis. In some embodiments, the distance 310 is measured from the write gap 326 to an MgO layer (not shown) of the magnetic sensor 328.

In the SGV assembly 300 of FIG. 3A, when writing data to a tape or other media, the tape moves over the writer 306 in the writing direction 330 (e.g., in the x-direction). In the SGV assembly 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly. As discussed above, the shield 332 may be used to further reduce magnetic cross-talk between the writer 306 and the reader 308. Thus, the writer 306 is able to write data to a portion of the tape, and the paired reader 308 is able to read verify the newly written portion of the tape immediately. As such, the SGV head assembly 300 is able to write data to and read verify data from a tape concurrently. The SGV head assembly 350, similar constructed, also has this immediate verify capability.

The SGV head assemblies 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV head assemblies 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV head assemblies 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4:
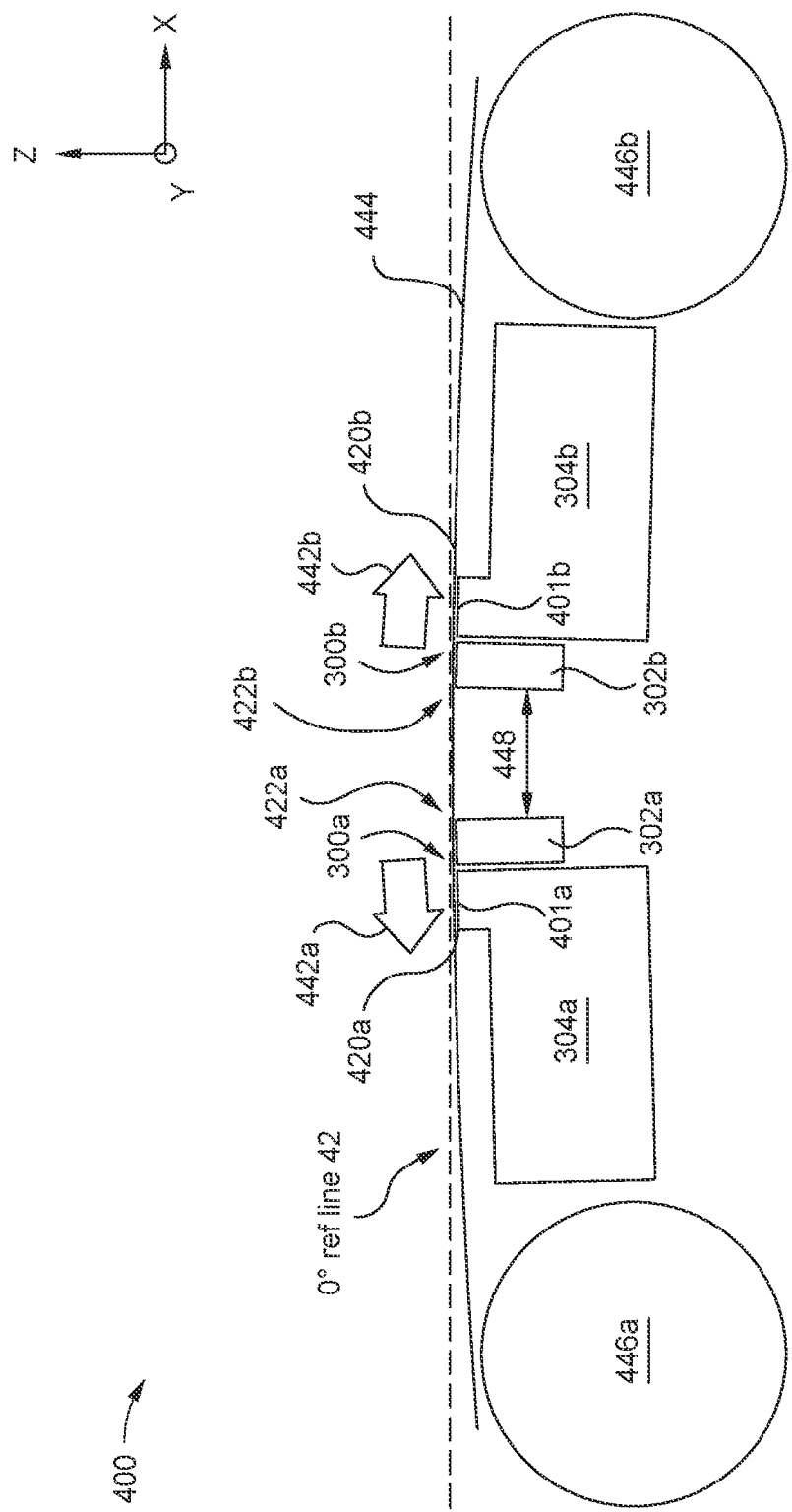
FIG. 4 illustrates a side view of a tape head comprising two SGV head assemblies, according to one embodiment.

FIG. 4 illustrates a side view of a tape head 400 comprising two SGV head assemblies 300a, 300b, according to one embodiment. The tape head 400 can be referred to as a tape head module or tape head module assembly, and for simplicity it is referred to as tape head below. The tape head 400 comprises a first SGV head assembly 300a and a second SGV head assembly 300b. Each SGV head assembly 300a, 300b may be the SGV head assembly 300 shown in FIG. 3A. The tape head 400 may be the tape head module assembly 200 of FIG. 2. The first SGV head assembly 300a and the second SGV head assembly 300b may be coupled together. In some embodiments, the read and write transducers 308, 306 in the first and second SGV head assemblies 300a, 300b may be aligned, to example, to operate in a legacy mode where one SGV head assembly (e.g., the first SGV head assembly 300a) writes data and the other SGV head assembly (e.g., the second SGV head assembly 300b) reads the data written by the first SGV head assembly 300a. The tape head 400 illustrates a SGV tape head 400 where the tape 444 contacts both the MFS 401a of the first SGV head assembly 300a and the MFS 401b of the second SGV head assembly 300b simultaneously in both directions the tape 444 moves.

In one embodiment, the first SGV head assembly 300a comprises a first closure 302a, one or more first writers 306

(shown in FIG. 3A) disposed adjacent to the first closure 302a, one or more first readers 308 (shown in FIG. 3A) disposed adjacent to the one or more first writers 306, and a first substrate 304a disposed adjacent to the one or more first readers 308. Similarly, in such an embodiment, the second SGV head assembly 300b comprises a second closure 302b, one or more second writers 306 (shown in FIG. 3A) disposed adjacent to the second closure 302b, one or more second readers 308 (shown in FIG. 3A) disposed adjacent to the one or more second writers 306, and a second substrate 304b disposed adjacent to the one or more second readers 308. The first SGV head assembly 300a has a first writing and reading direction 442a that is opposite to a second writing and reading direction 442b of the second SGV head assembly 300b.

In one embodiment, the first SGV head assembly 300a and the second SGV head assembly 300b are arranged in a face-to-face configuration or arrangement such that the first closure 302a of the first SGV head assembly 300a is disposed adjacent or proximate to the second closure 302b of the second SGV head assembly 300b. In other words, the first SGV head assembly 300a is a mirror image of the second SGV head assembly 300b, the second SGV head assembly 300b is a right hand head assembly like that shown in FIG. 3A and the first SGV head assembly 300a is a left hand head assembly. The first SGV head assembly 300a is spaced a distance 448 from the second SGV head assembly 300b of about 100 µm to about 1000 µm.

In other embodiments, the first SGV head assembly 300a and the second SGV head assembly 300b are arranged in a substrate-to-substrate configuration or reversed configuration, where the first substrate 304a is disposed adjacent to the second substrate 304b, and tape 444 encounters or passes over either the first closure 302a or the second closure 302b prior to passing over either the first or second substrate 304a, 304b, respectively. In such a configuration where the first and second head assemblies 300a, 300b are arranged like shown in FIG. 3A, the first head assembly 300a has the second writing and reading direction 442b that is opposite to the first writing and reading direction 442a of the second SGV head assembly 300b.

Referring to FIG. 4, which shows a SGV tape head 400, a MFS 401a, 401b of each of the first and second SGV head assemblies 300a, 300b is configured to support a tape 444 or other magnetic media. The MFS 401a, 401b of each of the first and second SGV head assemblies 300a, 300b includes surfaces of the writers 306 and the readers 308 of each SGV head assembly 300a, 300b. In some embodiments, the tape 444 may contact and wrap around a first substrate corner 420a and a first closure corner 422a of the first SGV head assembly 300a, and contact and wrap around a second closure corner 422b and a second substrate corner 420b of the second SGV head assembly 300b, resulting in the tape 444 being bent or angled downwards from a 0° reference line 426 (e.g., parallel to the x-axis). In such a configuration, the tape 444 contacts both the MFS 401a and the MFS 401b simultaneously in both directions the tape 444 moves. In other embodiments, the tape 444 may contact only one MFS (e.g., the first MFS 401a) while flying over or being spaced from the other MFS (e.g., the second MFS 401b). In such an embodiment, only one SGV head assembly 300a writes and reads data while the other SGV head assembly 300b does not write or read data.

The first SGV head assembly 300a and the second SGV head assembly 300b are both able to independently write and read verify data. For example, a first writer 306 of the first SGV head assembly 300a is able to write data to a portion of the tape 444, and an aligned or paired first reader 308 of the first SGV head assembly 300a is able to read verify the newly written portion of the tape 444 immediately. Similarly, a second writer 306 of the second SGV head assembly 300b is able to write data to a portion of the tape 444, and an aligned or paired second reader 308 of the second SGV head assembly 300b is able to read verify the newly written portion of the tape 444 immediately. As such, the first SGV head assembly 300a is able to write data to and read verify data from a tape independently from the second SGV head assembly 300b, and the second SGV head assembly 300b is able to write data to and read verify data from a tape independently from the first SGV head assembly 300a.

Figure 5A:
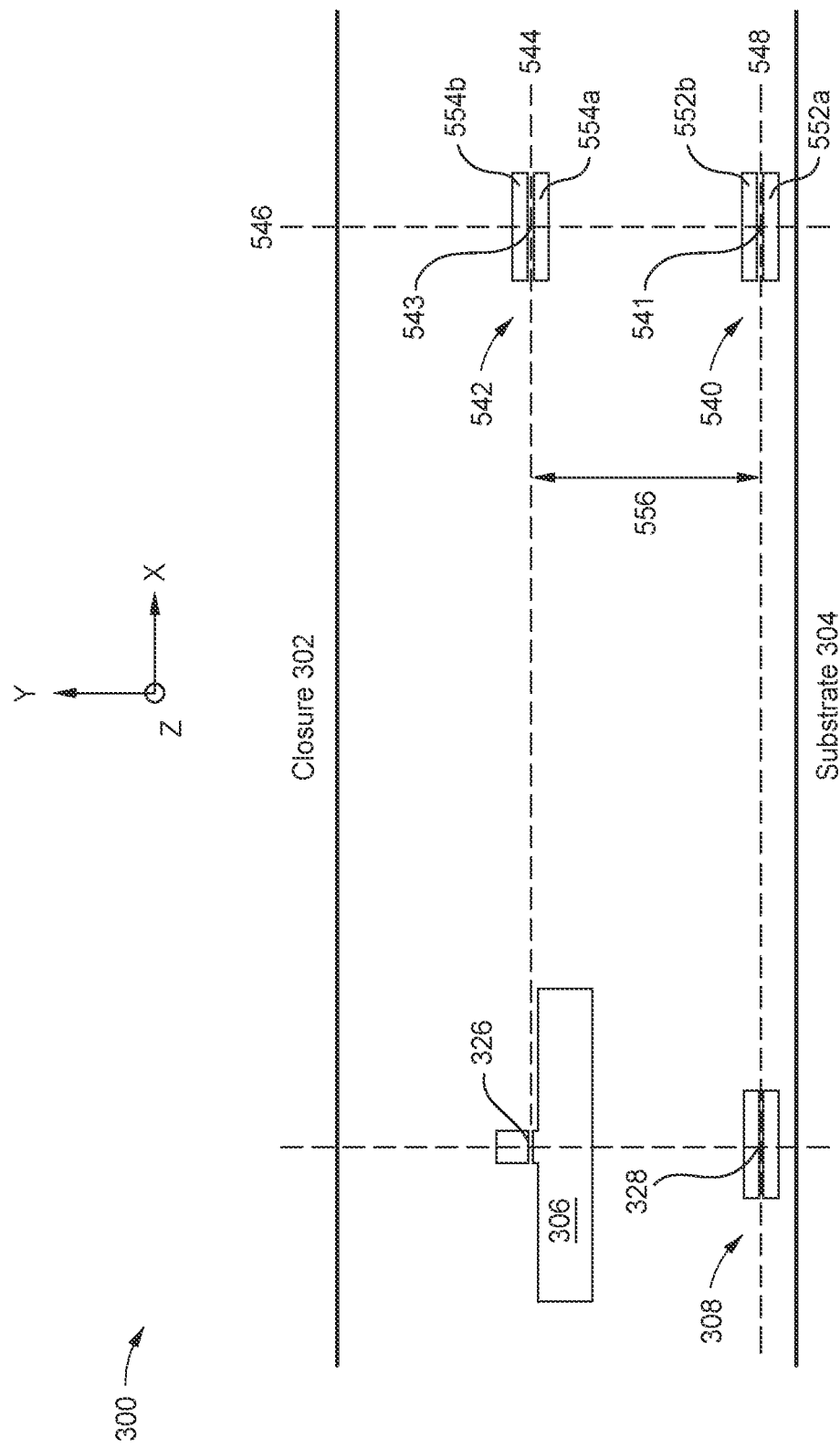
FIGS. 5A-5B illustrate the SGV head assemblies of FIGS. 3A-3B comprising a reader servo head and a writer servo head, according to various embodiments.
Figure 5B:
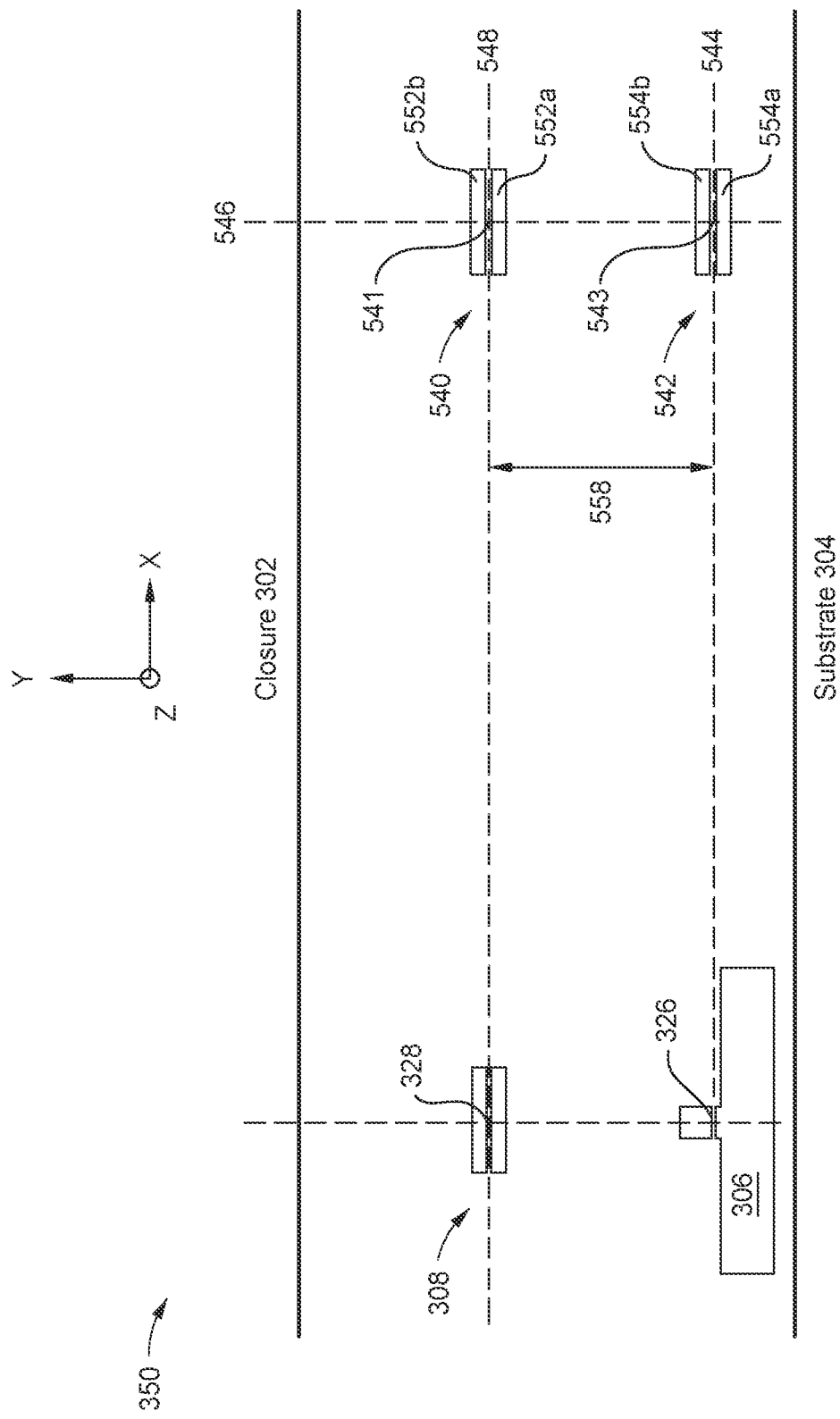
Figure 5C:
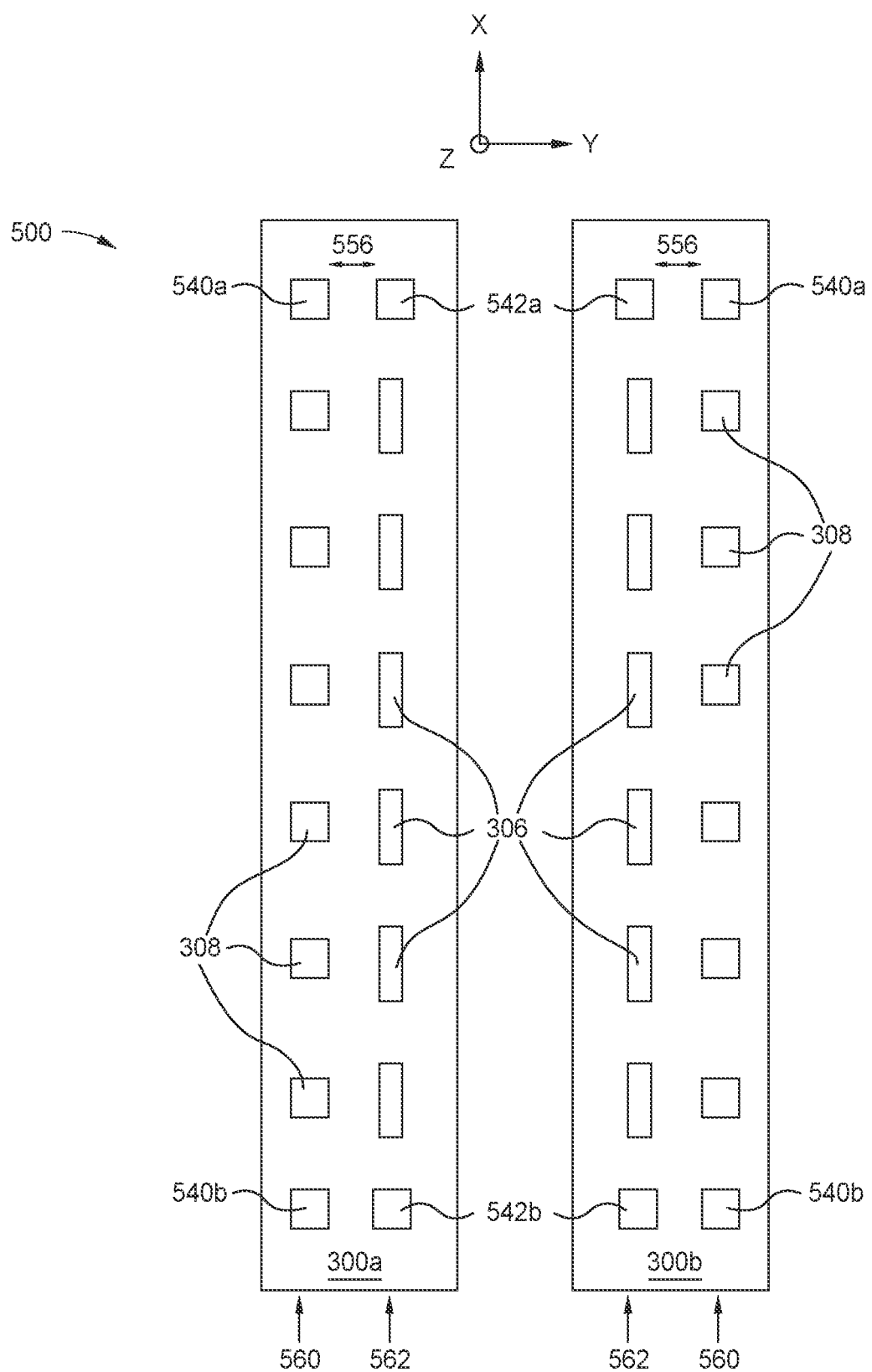
FIGS. 5C-5D illustrate tape heads comprising the SGV head assemblies of FIGS. 5A-5B, respectively, according to various embodiments.
Figure 5D:
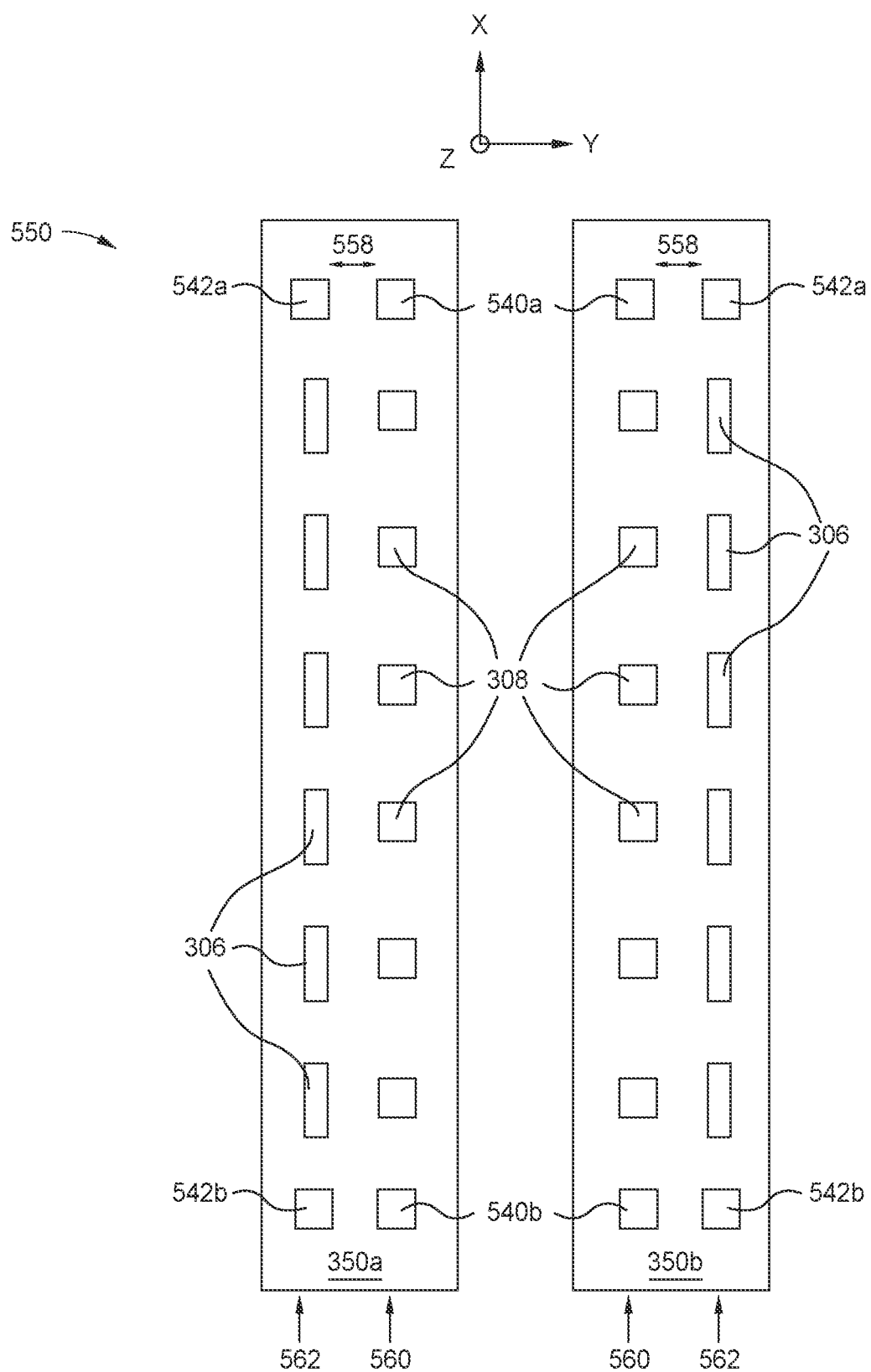

FIGS. 5A-5B illustrate MFS views of the SGV head assemblies 300, 350 of FIGS. 3A-3B, respectively, comprising a reader servo head 540 and a writer servo head 542, according to various embodiments. Each servo head is a reader configured to read servo data on the tape media. A "reader servo head" denotes a servo head associated with a reader element, while a "writer servo head" denotes a servo head associated with a writer element. FIGS. 5C-5D illustrate MFS views of tape heads 500, 550, respectively, comprising the SGV head assemblies 300, 350 of FIGS. 5A-5B, respectively, according to various embodiments. FIGS. 5A-5B illustrate different configurations of the SGV head assemblies 300, 350. As such, while the configurations of the SGV head assemblies 300, 350 vary in FIGS. 5A-5B, the components of the SGV head assemblies 300, 350 of FIGS. 5A-5B are the same. The SGV head assemblies 300, 350 may be utilized within a tape drive comprising a controller, such as the TED or tape drive 100 of FIG. 1A. The SGV head assemblies 300, 350 may be, or may be parts of, the tape head module assembly 200 of FIG. 2.

FIG. 5A illustrates the SGV head assembly 300 of FIG. 3A, where the reader 308 is disposed adjacent to the substrate 304 and the writer 306 is disposed adjacent to the closure 302. The SGV head assembly 300 comprises a first servo head 540, or a reader servo head 540, which comprises a sensor 541, such as a TMR sensor, disposed between a first shield 552a and a second shield 552b. The reader servo head 540 is coplanar with or aligned in the x-direction with the read head 308, as shown by line 548, and disposed adjacent to the substrate 304. In some embodiments, the sensor 541 of the reader servo head 540 is aligned in the x-direction with the sensor 328 of the read head 308.

The SGV head assembly 300 further comprises a second servo head 542, or a writer servo head 542, which comprises a sensor 543, such as a TMR sensor, disposed between a first shield 554a and a second shield 554b. The writer servo head 542 is disposed between the reader servo head 540 and the closure 302 in the y-direction, and the reader servo head 540 is disposed between the substrate 304 and the writer servo head 542 in the y-direction. The writer servo head 542 and the reader servo head 540 are each configured to read servo data from a tape.

The writer servo head 542 is aligned with the reader servo head 540 in the y-direction, as shown by line 546. In some embodiments, the sensor 543 of the writer servo head 542 is aligned with the sensor 541 of the reader servo head 540 in the y-direction. The writer servo head 542 and the reader servo head 540 are spaced apart a known distance or offset 556 in the y-direction of about 4 µm to about 20 µm. The writer servo head 542 is further coplanar with or aligned in the x-direction with the write head 306, as shown by line 544. In some embodiments, the sensor 543 of the writer servo head 542 is aligned in the x-direction with the writer 306. The writer servo head 542, or the sensor 543, may be substantially aligned in the x-direction with the write gap 326 of the write head 306. The sensor 543 of the writer servo head 542 may be offset from the write gap 326 of the write head 306 a distance of about 0 μm to about 5 μm in the x-direction, as discussed further below in FIGS. 6A-6E.

FIG. 5B illustrates the SGV head assembly 350 of FIG. 3B, where the writer 306 is disposed adjacent to the substrate 304 and the reader 308 is disposed adjacent to the closure 302. The SGV head assembly 350 comprises the first servo head 540, or the reader servo head 540, which comprises the sensor 541 disposed between the first shield 552a and the second shield 552b. The reader servo head 540 is coplanar with or aligned in the x-direction with the reader 308, as shown by line 548, and disposed adjacent to the closure 302. In some embodiments, the sensor 541 of the reader servo head 540 is aligned in the x-direction with the sensor 328 of the read head 308.

The SGV head assembly 350 further comprises the second servo head 542, or the writer servo head 542, which comprises the sensor 543 disposed between the first shield 554a and the second shield 554b. The reader servo head 540 is disposed between the writer servo head 542 and the closure 302 in the y-direction, and the writer servo head 542 is disposed between the substrate 304 and the reader servo head 540 in the y-direction. The writer servo head 542 and the reader servo head 540 are each configured to read servo data from a tape.

The writer servo head 542 is aligned with the reader servo head 540 in the y-direction, as shown by line 546. In some embodiments, the sensor 543 of the writer servo head 542 is aligned with the sensor 541 of the reader servo head 540 in the y-direction. The writer servo head 542 and the reader servo head 540 are spaced apart a known distance or offset 558 in the y-direction of about 4 μm to about 20 μm. The writer servo head 542 is further coplanar with or aligned in the x-direction with the write head 306, as shown by line 544. In some embodiments, the sensor 543 of the writer servo head 542 is aligned in the x-direction with the writer 306. The writer servo head 542, or the sensor 543, may be substantially aligned in the x-direction with the write gap 326 of the write head 306. The sensor 543 of the writer servo head 542 may be offset from the write gap 326 of the write head 306 a distance of about 0 μm to about 5 μm in the x-direction, as discussed further below in FIGS. 6A-6E.

While FIGS. 5A-5B each shows one writer servo head 542 and one reader servo head 540, the SGV head assemblies 300, 350 of FIGS. 5A-5B may comprise additional writer servo heads 542 and reader servo heads 540, as shown in FIGS. 5C-5D below. In both FIGS. 5A-5B, the reader servo head 540 may be used to accurately position a plurality of read heads 308 by reading servo data from a servo track of a tape and the writer servo head 542 may be used to accurately position a plurality of writer heads 306 by reading servo data from a servo track of a tape. The reader servo head 540 and the writer servo head 542 may further be configured to operation concurrently or independently.

In both FIGS. 5A-5B, the reader servo head 540 and the writer servo head 542 may be the same or the reader servo head 540 and the writer servo head 542 may be different. For example, the reader servo head 540 and the writer servo head 542 may vary in design or have different parameters, such as a width of the sensors 541, 543 being different, a spacing between the first and second shields 552a, 552b, 554a, 554b being different, a resistance area (RA) of each sensor 541, 543 being different, an electro-potential of the sensors 541, 543 being different, etc.

Furthermore, as noted above, the writer servo head 542 and the reader servo head 540 are spaced apart a known distance or offset 556, 558 in the y-direction of about 4 μm to about 20 μm. In some embodiments, the offset 556 between the writer servo head 542 and the reader servo head 540 in FIG. 5A may be about equal to the offset 558 between the writer servo head 542 and the reader servo head 540 in FIG. 5B. In other embodiments, the offset 556 between the writer servo head 542 and the reader servo head 540 in FIG. 5A differs from the offset 558 between the writer servo head 542 and the reader servo head 540 in FIG. 5B. For example, the offset 556 may be greater than the offset 558. The offsets 556, 558 are utilized to accurately calibrate the writer servo head 542 and/or the reader servo head 540.

While the write head 306 and the read head 308 are shown as being substantially aligned in both the x-direction and the y-direction in FIGS. 5A-5B, the writer 306 and the reader 308 may become or be fabricated mis-aligned or tilted from one another in the x-direction and/or the y-direction. In such scenarios, conventional tape heads and/or head assemblies comprising only one servo head disposed adjacent to the reader 308 (i.e., the reader servo head 540) may struggle to accurately position the writer 306 when writing data to a tape. Thus, by including the writer servo head 542, the writer servo head 542 can be used to accurately position the writer 306 even if the write head 306 and the read head 308 are or become mis-aligned. Moreover, the writer servo head 542 and the reader servo head 540 may be used concurrently to ensure the write heads 306 and/or read heads 308 are positioned as accurately as possible.

FIG. 5C illustrates a tape head 500 comprising the SGV head assemblies 300 of FIGS. 3A and 5A, according to one embodiment. The tape head 500 of FIG. 5C comprises two SGV head assemblies 300a, 300b, where each SGV head assembly 300a, 300b comprises the plurality of writers 306 and the plurality of readers 308. The plurality of write heads 306 of the first SGV head assembly 300a are disposed adjacent to the plurality of write heads 306 of the second SGV head assembly 300b. The first SGV head assembly 300a and the second SGV head assembly 300b may be arranged in a face-to-face configuration or in a substrate-to-substrate configuration (i.e., a reversed configuration), like described above in FIG. 4. While six writers 306 and six readers 308 are shown, the tape head 500 may comprise any number of writers 306 and readers 308, and as such, the number of writers 306 and readers 308 is not intended to be limiting.

In the embodiment of FIG. 5C, each SGV head assembly 300a, 300b further comprises a first reader servo head 540a, a second reader servo head 540b, a first writer servo head 542a, and a second writer servo head 542b. The first or the second writer servo head 542a, 542b may be the writer servo head 542 shown in FIG. 5A, and the first or the reader servo head 540a, 540b may be the reader servo head 540 shown in FIG. 5A.

However, in some embodiments, such as the embodiment shown in FIG. 5A, each SGV head assembly 300a, 300b may comprise only one writer servo head 542, which may be either the first or the second writer servo head 542a, 542b, and/or only one reader servo head 540, which may be either the first or the second reader servo head 540a, 540b. As such, each SGV head assembly 300a, 300b is not limited to having two reader servo heads 540a, 540b and two writer servo heads 542a, 542b. In other embodiments, each SGV head assembly 300a, 300b may comprise a different number of writer servo heads 542a and reader servo heads 540a. For example, each SGV head assembly 300a, 300b may comprise one writer servo head 542 and two reader servo heads 540a, 540b, or vice versa.

The first and second reader servo heads 540a, 540b are disposed at either end of the row 560 of the plurality of read heads 308 such that the plurality of read heads 308 are disposed between the first and second reader servo heads 540a, 540b in the x-direction. The first and second writer servo heads 542a, 542b are disposed at either end of the row 562 of the plurality of write heads 306 such that the plurality of write heads 306 are disposed between the first and second writer servo heads 542a, 542b in the x-direction. Each first reader servo head 540a is aligned in the y-direction with each first writer servo head 542a, and each second reader servo head 540b is aligned in the y-direction with each second writer servo head 542b. Moreover, each first reader servo head 540a is offset the distance 556 from each first writer servo head 542a, and each second reader servo head 540b is offset the distance 556 from each second writer servo head 542b.

FIG. 5D illustrates a tape head 550 comprising the SGV head assemblies 350 of FIGS. 3B and 5B. The tape head 550 of FIG. 5D comprises two SGV head assemblies 350a, 350b, where each SGV head assembly 350a, 350b comprises the plurality of write heads 306 and the plurality of read heads 308. The plurality of read heads 308 of the first SGV head assembly 350a are disposed adjacent to the plurality of read heads 308 of the second SGV head assembly 350b. The first SGV head assembly 350a and the second SGV head assembly 350b may be arranged in a face-to-face configuration or in a substrate-to-substrate configuration (i.e., a reversed configuration), like described above in FIG. 4. While six writers 306 and six readers 308 are shown, the tape head 550 may comprise any number of writers 306 and readers 308, and as such, the number of writers 306 and readers 308 is not intended to be limiting.

In the embodiment of FIG. 5D, each SGV head assembly 350a, 350b further comprises a first reader servo head 540a, a second reader servo head 540b, a first writer servo head 542a, and a second writer servo head 542b. The first or the second writer servo head 542a, 542b may be the writer servo head 542 shown in FIG. 5B, and the first or the reader servo head 540a, 540b may be the reader servo head 540 shown in FIG. 5B.

However, in some embodiments, such as the embodiment shown in FIG. 5B, each SGV head assembly 350a, 350b may comprise only one writer servo head 542, which may be either the first or the second writer servo head 542a, 542b, and/or only one reader servo head 540, which may be either the first or the second reader servo head 540a, 540b. As such, each SGV head assembly 350a, 350b is not limited to having two reader servo heads 540a, 540b and two writer servo heads 542a, 542b. In other embodiments, each SGV head assembly 350a, 350b may comprise a different number of writer servo heads 542a and reader servo heads 540a. For example, each SGV head assembly 350a, 350b may comprise one reader servo head 540 and two writer servo heads 542a, 542b, or vice versa.

The first and second reader servo heads 540a, 540b are disposed at either end of the row 560 of the plurality of read heads 308 such that the plurality of read heads 308 are disposed between the first and second reader servo heads 540a, 540b in the x-direction. The first and second writer servo heads 542a, 542b are disposed at either end of the row 562 of the plurality of write heads 306 such that the plurality of write heads 306 are disposed between the first and second writer servo heads 542a, 542b in the x-direction. Each first reader servo head 540a is aligned in the y-direction with each first writer servo head 542a, and each second reader servo head 540b is aligned in the y-direction with each second writer servo head 542b. Moreover, each first reader servo head 540a is offset the distance 556 from each first writer servo head 542a, and each second reader servo head 540b is offset the distance 556 from each second writer servo head 542b.

FIGS. 6A-6E illustrate SGV head assemblies 600, 625, 650, 675, 690, showing various placement options for a writer servo head 542, according to various embodiments. It is noted that the embodiments of FIGS. 6A-6E are intended to be examples of placement options for a writer servo head 542 only, and are not intended to be limiting. Rather, the embodiments of FIGS. 6A-6E are intended to illustrate the broad placement options for the writer servo head 542 that still enable the writer servo head 542 to function as desired.

While FIGS. 6A-6E illustrate a plurality of read heads 308a-308n disposed adjacent to a substrate 304, like described above in FIGS. 3A and 5A, the same placement options for the writer servo head 542 apply to embodiments where the plurality of write heads 306a-306n are disposed adjacent to the substrate 304, like shown and described above in FIGS. 3B and 5B. The plurality of write heads 306a-306n may be referred to as writers 306 or write heads 306. Thus, each of the SGV head assemblies 600, 625, 650, 675, 690 of FIGS. 6A-6E may each individually be the SGV head assembly 300 of FIGS. 3A, 5A, and 5C, or the SGV head assembly 350 of FIGS. 3B, 5B, and 5D.

Figure 6A:
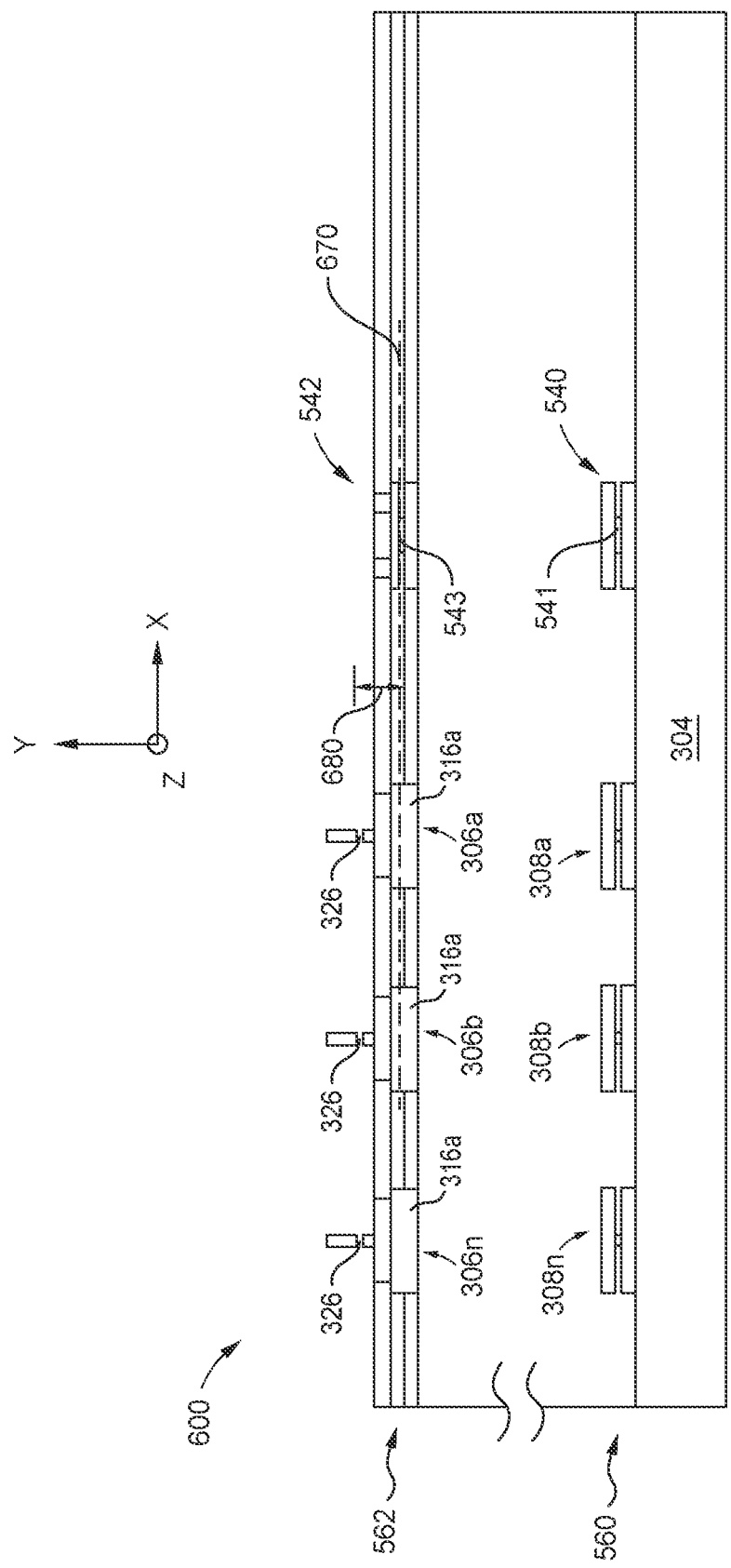
FIGS. 6A-6E illustrate SGV head assemblies showing the placement options for a read servo head and a write servo head, according to various embodiments.

FIG. 6A illustrates a SGV head assembly 600 where the sensor 543 of the writer servo head 542 is substantially aligned with a first portion 316a of the first write pole 316 of each writer 306 in the row 562 of writers 306a-306n, as shown by line 670. In other words, the sensor 543 of the writer servo head 542 is offset a distance 680 from the write gap 326 of each writer 306 in the −y-direction. The distance 680 is between about 0.1 μm to about 5 μm. In embodiments where the SGV head assembly 600 comprises a second writer servo head 542, like shown in FIGS. 5C-5D, the second writer servo head 542 is positioned the same as the writer servo head 542 shown in FIG. 6A.

Figure 6B:
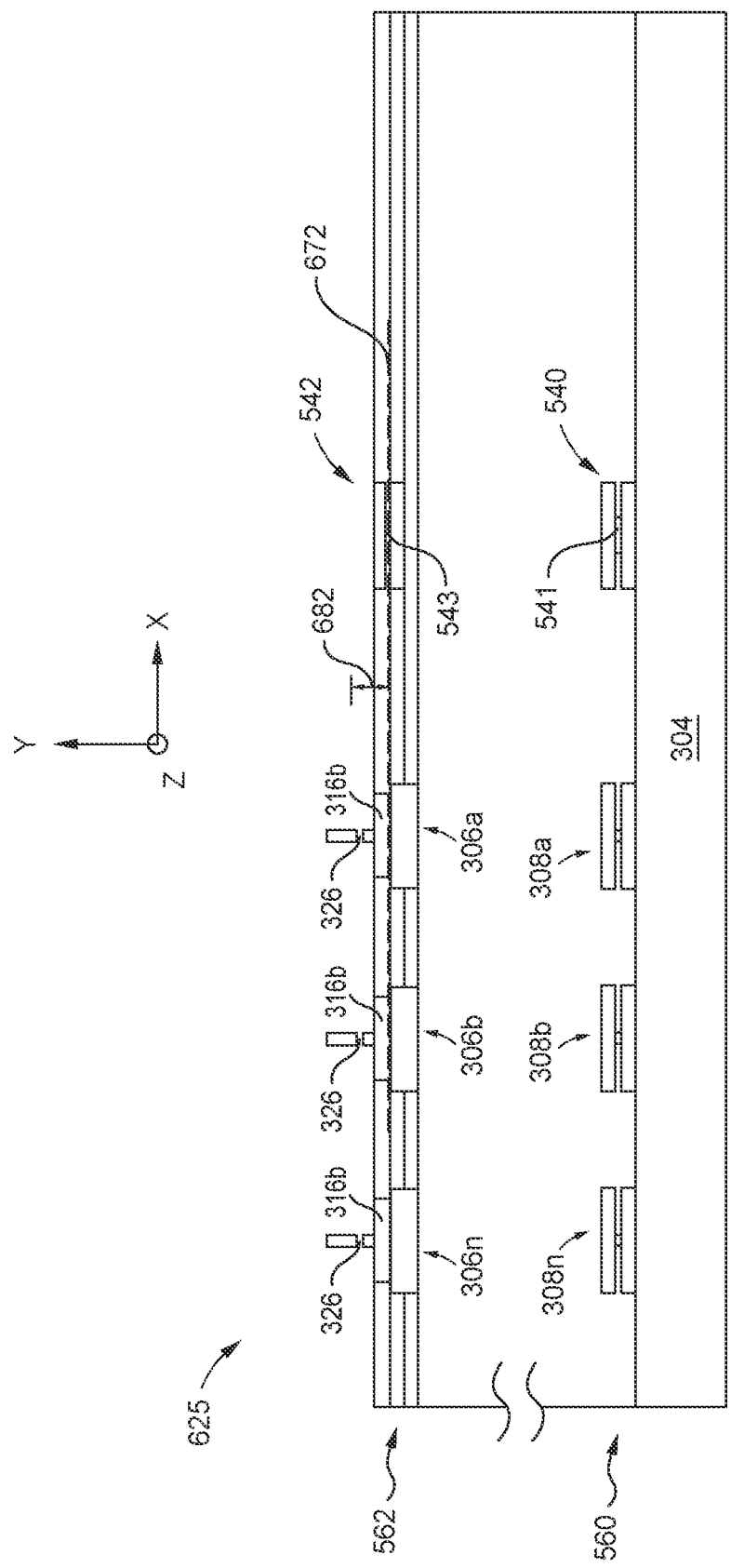

FIG. 6B illustrates a SGV head assembly 625 where the sensor 543 of the writer servo head 542 is substantially aligned with a second portion 316b of the first write pole 316 of each writer 306 in the row 562 of writers 306a-306n, as shown by line 672. In other words, the sensor 543 of the writer servo head 542 is offset a distance 682 from the write gap 326 of each writer 306 in the −y-direction. The distance 682 is between about 0.1 μm to about 3 μm. In embodiments where the SGV head assembly 625 comprises a second writer servo head 542, like shown in FIGS. 5C-5D, the second writer servo head 542 is positioned the same as the writer servo head 542 shown in FIG. 6B.

Figure 6C:
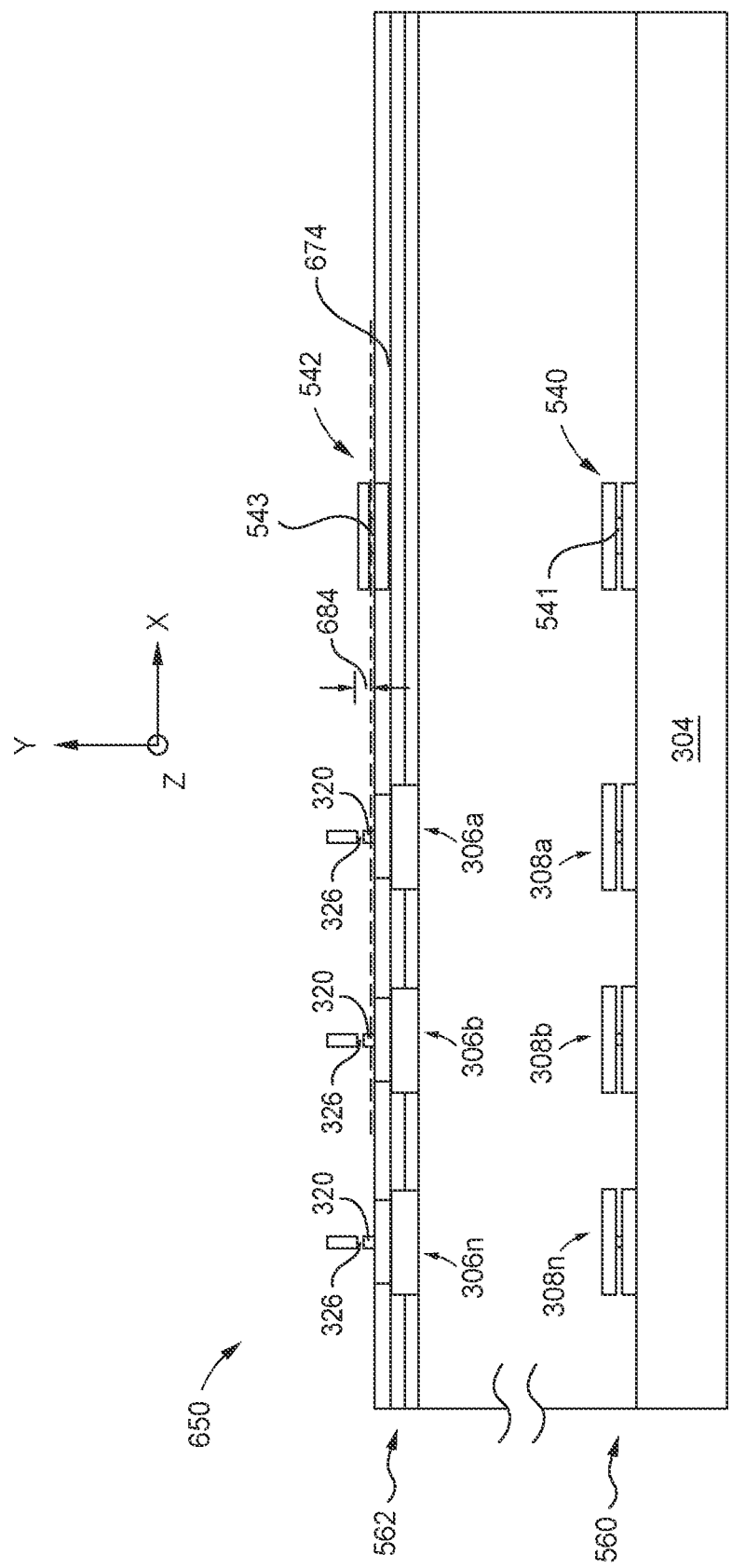

FIG. 6C illustrates a SGV head assembly 650 where the sensor 543 of the writer servo head 542 is substantially aligned with the notch 320 of each writer 306 in the row 562 of writers 306a-306n, as shown by line 674. In other words, the sensor 543 of the writer servo head 542 is offset a distance 684 from the write gap 326 of each writer 306 in the −y-direction. The distance 684 is between about 0.01 μm to about 1 μm. In embodiments where the SGV head assembly 650 comprises a second writer servo head 542, like shown in FIGS. 5C-5D, the second writer servo head 542 is positioned the same as the writer servo head 542 shown in FIG. 6C.

Figure 6D:
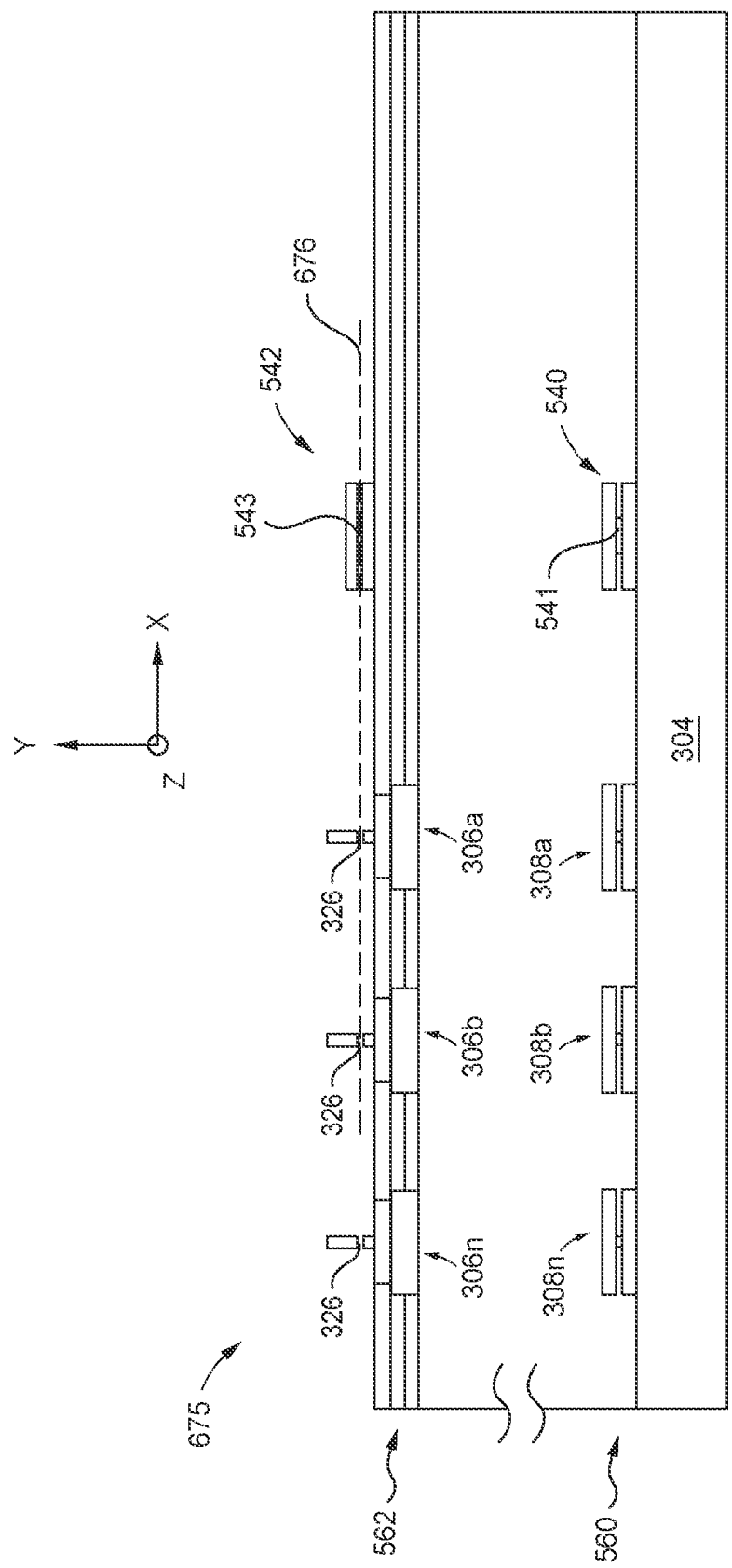

FIG. 6D illustrates a SGV head assembly 675 where the sensor 543 of the writer servo head 542 is substantially aligned with the write gap 326 of each writer 306 in the row 562 of writers 306a-306n, as shown by line 676. As such, the sensor 543 of the writer servo head 542 may be offset from the write gap 326 of each writer 306 in the y-direction about 0 μm to about 0.5 μm. In embodiments where the SGV head assembly 675 comprises a second writer servo head 542, like shown in FIGS. 5C-5D, the second writer servo head 542 is positioned the same as the writer servo head 542 shown in FIG. 6D.

Figure 6E:
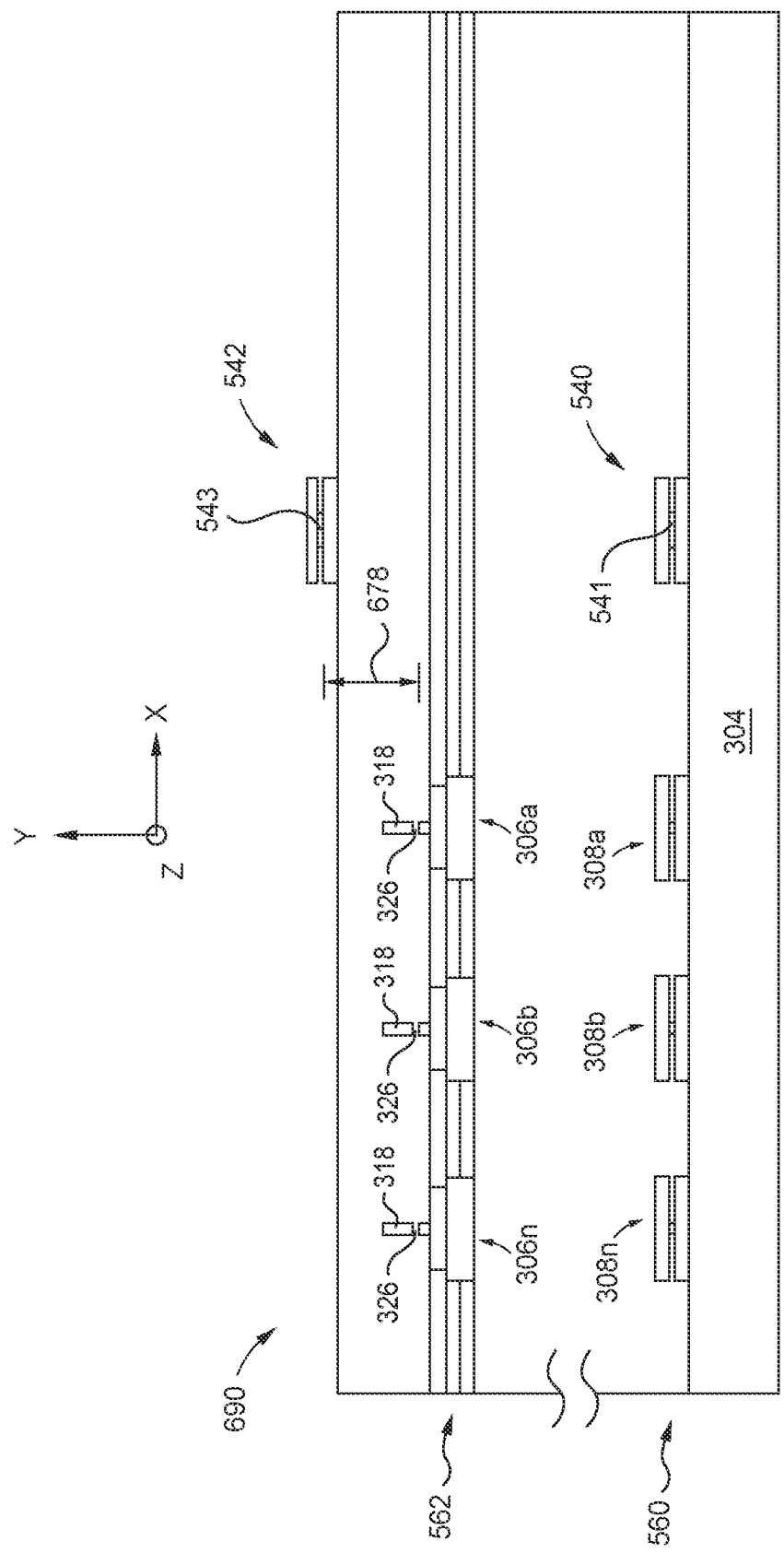

FIG. 6E illustrates a SGV head assembly 690 where the sensor 543 of the writer servo head 542 is disposed above the second write pole 318 of each writer 306 in the row 562 of writers 306a-306n. In other words, the sensor 543 of the writer servo head 542 is offset a distance 678 from the write gap 326 of each writer 306 in the y-direction. The distance 678 is between about 0.1 μm to about 5 μm. In embodiments where the SGV head assembly 690 comprises a second writer servo head 542, like shown in FIGS. 5C-5D, the second writer servo head 542 is positioned the same as the writer servo head 542 shown in FIG. 6E.

Thus, the SGV head assemblies 600, 625, 650, 675, 690 of FIGS. 6A-6E illustrate that the sensor 543 of the writer servo head 542 may be offset from the write gap 326 of each write head 306 in the y-direction or the -y-direction by about 0 μm to about 5 μm, and the writer servo head 542 is still configured to accurately position the write heads 306a-306n when writing data to a tape.

Therefore, by utilizing a tape head comprising one or more head assemblies, each head assembly comprising at least one writer servo head aligned with a row of write heads and at least one reader servo head aligned with a row of read heads, the tape head is able to accurately and independently position the write heads using the writer servo head(s) when writing data to a tape and position the read heads using the reader servo head(s) when reading data from the tape, even if the write heads and read heads are or become mis-aligned. Moreover, the writer servo head and the reader servo head may be used concurrently to ensure the write heads and/or read heads are positioned as accurately as possible. As such, data can be written to and read from a tape with more accuracy and precision.

In one embodiment, a tape head comprises one or more head assemblies, each of the one or more head assemblies comprising: a plurality of write heads aligned in a first row, the first row extending in a first direction, a plurality of read heads aligned in a second row parallel to the first row, the second row extending in the first direction, at least one writer servo head disposed adjacent to the plurality of write heads, the at least one writer servo head being aligned with the first row in the first direction, and at least one reader servo head disposed adjacent to the plurality of read heads, the at least one reader servo head being aligned with the second row in the first direction.

The at least one writer servo head is aligned with the at least one reader servo head in a second direction perpendicular to the first direction. The at least one writer servo head is spaced from the at least one reader servo head a distance of about 4 μm to about 20 μm in the second direction. The at least one writer servo head is different than the at least one reader servo head. The at least one writer servo head and the at least one reader servo head are configured to operate concurrently. A sensor of the at least one writer servo head is offset a distance of about 0 μm to about 5 μm from a write gap of a first write head of the plurality of write heads in a second direction perpendicular to the first direction. A tape drive comprises the tape head. The tape drive comprises a controller configured to: control a first head assembly of the one or more head assemblies to write data to a tape using the plurality of write heads and read verify the data using the plurality of read heads, use signals from the at least one writer servo head to accurately position the plurality of write heads to write to the tape, and use signals from the at least one reader servo head to accurately position the plurality of read heads to read from the tape.

In another embodiment, a tape head comprises one or more head assemblies, each of the one or more head assemblies comprising: a plurality of write heads aligned in a first row, the first row extending in a first direction, wherein each of the plurality of write heads comprises a first write pole, a second write pole, and a write gap disposed between the first and second write poles, a plurality of read heads aligned in a second row parallel to the first row, the second row extending in the first direction, wherein each of the plurality of read heads comprises a first sensor, at least one writer servo head disposed adjacent to the plurality of write heads, the at least one writer servo head being aligned with the first row in the first direction, wherein the at least one writer servo head comprises a second sensor, and at least one reader servo head disposed adjacent to the plurality of read heads, the at least one reader servo head being aligned with the second row in the first direction, wherein the at least one reader servo head comprises a third sensor.

The second sensor of the at least one writer servo head is substantially aligned with the write gap of a first write head of the plurality of write heads in the first direction. The third sensor of the at least one reader servo head is substantially aligned with the first sensor of a first read head of the plurality of read heads in the first direction. The second sensor of the at least one writer servo head is substantially aligned with the third sensor of the at least one reader servo head in a second direction perpendicular to the first direction. The second sensor of the at least one writer servo head is offset a distance of about 0 μm to about 5 μm from the write gap of a first write head of the plurality of write heads in a second direction perpendicular to the first direction. The at least one writer servo head is aligned with the at least one reader servo head in a second direction perpendicular to the first direction. The at least one writer servo head is spaced from the at least one reader servo head a distance of about 4 μm to about 20 μm in the second direction. The at least one writer servo head is two writer servo heads, the plurality or write heads being disposed between the two writer servo heads. A tape drive comprises the tape head. The tape drive comprises a controller configured to: operate the at least one writer servo head and the at least one reader servo head concurrently, use signals from the at least one writer servo head to position the plurality of write heads to write to a tape, and use signals from the at least one reader servo head to position the plurality of read heads to read from the tape.

In yet another embodiment, a tape drive comprises a first head assembly comprising: a plurality of first write heads aligned in a first row, the first row extending in a first direction, a plurality of first read heads aligned in a second row parallel to the first row, the second row extending in the first direction, at least one first writer servo head disposed adjacent to the plurality of first write heads, the at least one first writer servo head being aligned with the first row in the first direction, and at least one first reader servo head disposed adjacent to the plurality of first read heads, the at least one first reader servo head being aligned with the second row in the first direction and aligned with the at least one first writer servo in a second direction perpendicular to the first direction, wherein the at least one first writer servo head and the at least one first reader servo head are configured to operate concurrently. The tape drive further comprises a second head assembly comprising: a plurality of second write heads aligned in a third row, the third row extending in the first direction, a plurality of second read heads aligned in a fourth row parallel to the third row, the fourth row extending in the first direction, at least one second writer servo head disposed adjacent to the plurality of second write heads, the at least one second writer servo head being aligned with the third row in the first direction, and at least one second reader servo head disposed adjacent to the plurality of second read heads, the at least one second reader servo head being aligned with the fourth row in the first direction and aligned with the at least one second writer servo in the second direction. The tape drive further comprises a controller configured to operate the at least one second writer servo head and the at least one second reader servo head concurrently.

The controller is further configured to control the first head assembly to write first data to a tape using the plurality of first write heads and read verify the first data using the plurality of first read heads, and control the second head assembly to write second data to the tape using the plurality of second write heads and read verify the second data using the plurality of second read heads. The controller is further configured to use signals from the at least one first writer servo head to accurately position the plurality of first write heads to write to a tape, and use signals from the at least one second writer servo head to accurately position the plurality of second write heads to write to the tape. The controller is further configured to use signals from the at least one first reader servo head to accurately position the plurality of first read heads to read from a tape, and use signals from the at least one second reader servo head to accurately position the plurality of second read heads to read from the tape. A first sensor of the at least one first writer servo head is offset a first distance of about 0 μm to about 5 μm from a write gap of a first write head of the plurality of first write heads in the second direction. A second sensor of the at least one second writer servo head is offset a second distance of about 0 μm to about 5 μm from a write gap of a first write head of the plurality of second write heads in the second direction.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
one or more head assemblies, each of the one or more head assemblies comprising:
a substrate;
a plurality of write heads aligned in a first row on the substrate, the first row extending in a first direction, wherein the plurality of write heads are controllable to write data to a tape;
a plurality of read heads aligned in a second row parallel to the first row on the substrate, the second row extending in the first direction, wherein the plurality of read heads are controllable to read data from the tape;
at least one writer servo head disposed adjacent to the plurality of write heads on the substrate, the at least one writer servo head being aligned with the first row in the first direction, wherein the at least one writer servo is controllable to read servo data from the tape; and
at least one reader servo head disposed adjacent to the plurality of read heads on the substrate, the at least one reader servo head being aligned with the second row in the first direction, wherein the at least one reader servo is controllable to read servo data from the tape.

2. The tape head of claim 1, wherein the at least one writer servo head is aligned with the at least one reader servo head in a second direction perpendicular to the first direction.

3. The tape head of claim 2, wherein the at least one writer servo head is spaced from the at least one reader servo head a distance of about 4 μm to about 20 μm in the second direction.

4. The tape head of claim 1, wherein the at least one writer servo head is different than the at least one reader servo head.

5. The tape head of claim 1, wherein the at least one writer servo head and the at least one reader servo head are configured to operate concurrently.

6. The tape head of claim 1, wherein a sensor of the at least one writer servo head is offset a distance of about 0 μm to about 5 μm from a write gap of a first write head of the plurality of write heads in a second direction perpendicular to the first direction.

7. A tape drive comprising the tape head of claim 1.

8. The tape drive of claim 7, further comprising a controller configured to:
control a first head assembly of the one or more head assemblies to write data to a tape using the plurality of write heads and read verify the data using the plurality of read heads;
use signals from the at least one writer servo head to position the plurality of write heads to write to the tape; and
use signals from the at least one reader servo head to accurately position the plurality of read heads to read from the tape.

9. A tape head, comprising:
one or more head assemblies, each of the one or more head assemblies comprising:
a substrate;
a plurality of write heads aligned in a first row on the substrate, the first row extending in a first direction, wherein each of the plurality of write heads comprises a first write pole, a second write pole, and a write gap disposed between the first and second write poles, and wherein the plurality of write heads are controllable to write data to a tape;
a plurality of read heads aligned in a second row parallel to the first row on the substrate, the second row extending in the first direction, wherein each of the plurality of read heads comprises a first sensor, and wherein the plurality of read heads are controllable to read data from the tape;
at least one writer servo head disposed adjacent to the plurality of write heads on the substrate, the at least one writer servo head being aligned with the first row in the first direction, wherein the at least one writer servo head comprises a second sensor, and wherein the at least one writer servo is controllable to read servo data from the tape; and
at least one reader servo head disposed adjacent to the plurality of read heads on the substrate, the at least one reader servo head being aligned with the second row in the first direction, wherein the at least one reader servo head comprises a third sensor, and wherein the at least one reader servo is controllable to read servo data from the tape.

10. The tape head of claim 9, wherein the second sensor of the at least one writer servo head is substantially aligned with the write gap of a first write head of the plurality of write heads in the first direction.

11. The tape head of claim 9, wherein the third sensor of the at least one reader servo head is substantially aligned with the first sensor of a first read head of the plurality of read heads in the first direction.

12. The tape head of claim 9, wherein the second sensor of the at least one writer servo head is substantially aligned with the third sensor of the at least one reader servo head in a second direction perpendicular to the first direction.

13. The tape head of claim 9, wherein the second sensor of the at least one writer servo head is offset a distance of about 0 µm to about 5 µm from the write gap of a first write head of the plurality of write heads in a second direction perpendicular to the first direction.

14. The tape head of claim 9, wherein the at least one writer servo head is aligned with the at least one reader servo head in a second direction perpendicular to the first direction, and wherein the at least one writer servo head is spaced from the at least one reader servo head a distance of about 4 µm to about 20 µm in the second direction.

15. The tape head of claim 9, wherein the at least one writer servo head is two writer servo heads, the plurality or write heads being disposed between the two writer servo heads.

16. A tape drive comprising the tape head of claim 9.

17. The tape head of claim 16, further comprising a controller configured to:
  operate the at least one writer servo head and the at least one reader servo head concurrently;
  use signals from the at least one writer servo head to position the plurality of write heads to write to a tape; and
  use signals from the at least one reader servo head to position the plurality of read heads to read from the tape.

18. A tape drive, comprising:
  a first head assembly, comprising:
    a first substrate;
    a plurality of first write heads aligned in a first row on the first substrate, the first row extending in a first direction, wherein the plurality of first write heads are controllable to write data to a tape;
    a plurality of first read heads aligned in a second row parallel to the first row on the first substrate, the second row extending in the first direction, wherein the plurality of second read heads are controllable to read data from the tape;
    at least one first writer servo head disposed adjacent to the plurality of first write heads on the first substrate, the at least one first writer servo head being aligned with the first row in the first direction, and wherein the at least one writer reader servo is controllable to read servo data from the tape; and
    at least one first reader servo head disposed adjacent to the plurality of first read heads on the first substrate, the at least one first reader servo head being aligned with the second row in the first direction and aligned with the at least one first writer servo in a second direction perpendicular to the first direction, wherein the at least one first writer servo head and the at least one first reader servo head are configured to operate concurrently, and wherein the at least one first reader servo is controllable to read servo data from the tape;
  a second head assembly, comprising:
    a second substrate;
    a plurality of second write heads aligned in a third row, the third row extending in the first direction on the second substrate, wherein the plurality of second write heads are controllable to write data to the tape;
    a plurality of second read heads aligned in a fourth row parallel to the third row on the second substrate, the fourth row extending in the first direction, wherein the plurality of second read heads are controllable to read data from the tape;
    at least one second writer servo head disposed adjacent to the plurality of second write heads on the second substrate, the at least one second writer servo head being aligned with the third row in the first direction, wherein the at least one second writer servo is controllable to read servo data from the tape; and
    at least one second reader servo head disposed adjacent to the plurality of second read heads on the second substrate, the at least one second reader servo head being aligned with the fourth row in the first direction and aligned with the at least one second writer servo in the second direction, wherein the at least one second reader servo is controllable to read servo data from the tape; and
  a controller configured to operate the at least one second writer servo head and the at least one second reader servo head concurrently.

19. The tape drive of claim 18, wherein the controller is further configured to:
  control the first head assembly to write first data to a tape using the plurality of first write heads and read verify the first data using the plurality of first read heads, and
  control the second head assembly to write second data to the tape using the plurality of second write heads and read verify the second data using the plurality of second read heads.

20. The tape drive of claim 18, wherein the controller is further configured to:
  use signals from the at least one first writer servo head to position the plurality of first write heads to write to a tape, and
  use signals from the at least one second writer servo head to position the plurality of second write heads to write to the tape.

21. The tape drive of claim 18, wherein the controller is further configured to:
  use signals from the at least one first reader servo head to position the plurality of first read heads to read to a tape, and
  use signals from the at least one second reader servo head to position the plurality of second read heads to read from the tape.

22. The tape drive of claim 18, wherein a first sensor of the at least one first writer servo head is offset a first distance of about 0 µm to about 5 µm from a write gap of a first write head of the plurality of first write heads in the second direction, and wherein a second sensor of the at least one second writer servo head is offset a second distance of about 0 µm to about 5 µm from a write gap of a first write head of the plurality of second write heads in the second direction.

* * * * *